United States Patent
Smith

(10) Patent No.: US 7,910,689 B2
(45) Date of Patent: Mar. 22, 2011

(54) METHOD AND APPARATUS FOR SEPARATION OF POLYMER FROM A SLURRY

(75) Inventor: Lawrence C. Smith, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1025 days.

(21) Appl. No.: 11/724,890

(22) Filed: Mar. 16, 2007

(65) Prior Publication Data

US 2008/0227952 A1    Sep. 18, 2008

(51) Int. Cl.
*C08F 6/24* (2006.01)
*B01D 1/26* (2006.01)

(52) U.S. Cl. ..... 528/501; 159/17.1; 159/17.2; 159/26.1; 159/27.1

(58) Field of Classification Search ............... 159/17.1, 159/17.2, 26.1, 27.1; 528/501
See application file for complete search history.

(56) References Cited

U.S. PATENT DOCUMENTS

| | | | |
|---|---|---|---|
| 4,087,602 A * | 5/1978 | Mietzner et al. | 528/481 |
| 6,815,511 B2 | 11/2004 | Verser et al. | |
| 6,818,186 B2 | 11/2004 | Burns et al. | |
| 7,034,090 B2 | 4/2006 | Kendrick | |
| 7,087,685 B2 | 8/2006 | Burns et al. | |
| 2006/0287442 A1 * | 12/2006 | McElvain et al. | 526/64 |

FOREIGN PATENT DOCUMENTS

| | | | |
|---|---|---|---|
| GB | 2 030 153 | | 4/1980 |
| WO | WO 93/11171 | * | 6/1993 |
| WO | WO 2004/000891 | | 12/2003 |

* cited by examiner

*Primary Examiner* — Fred M Teskin

(57) ABSTRACT

Provided for separating polymer from a slurry comprising polymer and unreacted carrier fluid is (a) a method comprising supplying slurry to a first heating means to increase the temperature of the slurry, using a first separator means to extract a portion of unreacted carrier fluid from the slurry to obtain a slurry enriched in polymer, supplying the enriched slurry to a second heating means to increase the temperature of the enriched slurry, and using a second separator means to extract an additional portion of unreacted carrier fluid from the enriched slurry to obtain a further enriched slurry, and (b) an apparatus comprising a first heating means, a first separator means, a second heating means and a second separator means.

6 Claims, 2 Drawing Sheets

METHOD AND APPARATUS FOR SEPARATION OF POLYMER FROM A SLURRY

FIELD OF THE INVENTION

This invention relates generally to a method and apparatus for improving separation of polymer from unreacted carrier fluid in a slurry polymerization process and increasing the operating rate of a slurry polymerization unit.

BACKGROUND OF THE INVENTION

In many current slurry polymerization processes, the slurry exits the polymerization reactor(s) and undergoes additional final (downstream) processing steps which may including heating the solids, removal of residual unreacted carrier fluid and/or catalyst system deactivation. As used herein, "slurry" shall mean a combination of polymer solids suspended in unreacted carrier fluid. The carrier fluid may be unreacted monomer and/or an inert diluent. However, prior to the final processing steps, the excess unreacted carrier fluid must be separated from the polymer. Typically, the separated, unreacted carrier fluid is recovered and recycled back to the reactor(s). The polymer and residual unreacted carrier fluid then continue downstream for the final processing steps where the polymer is ultimately sold or fed to an extruder for pelletization prior to sale.

Many current processes for the separation of a polymer slurry include the use of a series of heated jacketed pipes followed by a first separator, usually operating at high pressure, and finally a second separator, generally operating under low pressure conditions. The heated jacketed pipes are used to increase the temperature of the slurry. These pipes may be heated by steam, hot water or other similar methods commonly known in the art. The slurry is heated by the pipes to a temperature sufficient to vaporize at least a portion of the unreacted carrier fluid and is then fed into the first separator. The first separation of the vaporized portion of the unreacted carrier fluid from the polymer generally occurs at a pressure of at least 15 atmospheres (1.52 megapascals (MPa)) in the first separator. Separation may be achieved by methods including cyclone separators, gravity separators, bag filters or other methods commonly known in the art. Preferably, the vaporized, unreacted carrier fluid is recycled to the reactor(s) by methods commonly known in the art.

After the first separation, the slurry is enriched in polymer, but significant amounts of unreacted carrier fluid may still be present. In many current methods, the next processing step is the separation of the enriched slurry. The additional separation generally includes feeding the enriched slurry to a second separator. The second separator generally operates at a pressure of about 1 atmosphere (0.10 MPa) or less. Separation in this step may be achieved by use of a bag filter, though other methods commonly known in the art may also be employed. In the second separation step, the reduced pressure of the second separator causes an expansion of the remaining unreacted carrier fluid and a significant reduction in the temperature of the enriched slurry. Preferably, the additional unreacted carrier fluid recovered during the second separation is compressed and recycled to the reactor(s) by methods commonly known in the art.

Current processes for separation of a slurry, such as described above, are limited as to the temperature to which the slurry may be heated, particularly prior to entering the high pressure first separator, as the catalyst system has not been deactivated at that point and increased temperatures may cause unfavorable additional reactions to occur. This temperature limitation may, in turn, limit the amount of unreacted carrier fluid extracted from the slurry in both the first separator and the second separator, thereby burdening downstream processing equipment with the final removal of residual unreacted carrier fluid. Additionally, the expansion of the unreacted carrier fluid in the second separator due to reduced pressure may result in limitations on current operating rates and thus, reduced processing capacity. As used in this specification and in the claims "operating rate(s)" shall mean the quantity of polymer processed through a slurry polymerization unit over a specified period of time.

The equipment commonly used to perform the final, downstream processing steps is generally very large in size and often located in elevated structures to facilitate polymer particle movement. As such, replacement of currently installed equipment to accommodate increased operating rates and capacities may be difficult and costly.

Opportunities exist in the art for a method and apparatus to improve the efficiency of separating polymer from a slurry, including increasing recovery of unreacted carrier fluid, thereby increasing the overall operating rate and resulting capacity of a slurry polymerization unit. The present invention meets these and other needs.

SUMMARY OF THE INVENTION

The present invention relates generally to a method and apparatus for separating polymer from unreacted carrier fluid in a slurry polymerization process. In one embodiment, the invention generally relates to a method for separating polymer from a slurry, the slurry comprising polymer and unreacted carrier fluid, the method comprising heating the slurry to increase the temperature of the slurry, removing a portion of unreacted carrier fluid from the slurry in a first extraction to obtain a slurry enriched in polymer, the first extraction occurring at a first pressure, heating the enriched slurry to increase the temperature of the enriched slurry, and removing an additional portion of unreacted carrier fluid from the enriched slurry in a second extraction to obtain a further enriched slurry, the second extraction occurring at a second pressure, the second pressure being less than the first pressure.

In another embodiment, the invention generally relates to a method for separating polymer from a slurry, the slurry comprising polymer and unreacted carrier fluid, the method comprising supplying the slurry to a first heating means to increase the temperature of the slurry, using a first separator means to extract a portion of the unreacted carrier fluid from the slurry to obtain a slurry enriched in polymer, the first separator means having a first pressure, supplying the enriched slurry to a second heating means to increase the temperature of the enriched slurry, and using a second separator means to extract an additional portion of unreacted carrier fluid from the enriched slurry to obtain a further enriched slurry, the second separator means having a second pressure, the second pressure being less than the first pressure.

In yet another embodiment, the invention generally relates to a method for increasing the operating rate of a slurry polymerization unit, comprising the steps of (a) separating polymer from a slurry, the slurry comprising polymer and unreacted carrier fluid, the separation comprising supplying the slurry to a first heating means to increase the temperature of the slurry, using a first separator means to extract a portion of the unreacted carrier fluid from the slurry to obtain a slurry enriched in polymer, the first separator means having a first pressure, supplying the enriched slurry to a second heating means to increase the temperature of the enriched slurry, and using a second separator means to extract an additional portion of the unreacted carrier fluid from the enriched slurry to obtain a further enriched slurry, the second separator means having a second pressure, the second pressure being less than the first pressure, and (b) providing the further enriched slurry to downstream processing equipment for further processing.

In still another embodiment, the invention generally relates to an apparatus for separating polymer from a slurry comprising polymer and unreacted carrier fluid, the apparatus comprising a first heating means for increasing the temperature of the slurry, a first separator means for extracting a portion of the unreacted carrier fluid from the slurry to obtain a slurry enriched in polymer, the first separator means having a first pressure, a second heating means for increasing the temperature of the enriched slurry, and a second separator means for extracting an additional portion of the unreacted carrier fluid from the enriched slurry to obtain a further enriched slurry, the second separator means having a second pressure, the second pressure being less than the first pressure.

It is an object of the present invention, therefore, to provide a method and apparatus capable of improving the efficiency of separating polymer obtained from a slurry polymerization process, including increasing recovery of unreacted carrier fluid, and thereby increasing the overall operating rate and capacity of a slurry polymerization unit.

DETAILED DESCRIPTION OF THE INVENTION

Various specific embodiments, versions and examples of the invention will now be described, including exemplary embodiments that are included herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will always refer to the appended claims, including their equivalents, and elements or limitations that are equivalent to those that are recited. Any reference to the "invention" may refer to one or more, but not necessarily all, of the embodiments disclosed herein.

It should be understood that the figures included herein are not necessarily to scale. In certain instances, details which are not necessary for the understanding of the present invention or which render other details difficult to perceive may have been omitted.

In one embodiment, the invention is an improved method and apparatus for the separation of polymer obtained from a slurry polymerization process, wherein the slurry comprises polymer and unreacted carrier fluid. Preferably, the slurry polymerization process is used to polymerize an olefin, such as propylene or ethylene. As will be known to persons skilled in the art, in a slurry polymerization process, the polymers are contained within a carrier fluid which may comprise unreacted monomer, such as $C_1$-$C_{20}$ alkenes, preferably propylene monomer or ethylene monomer, and/or inert diluents, such as $C_1$-$C_{20}$ alkanes, preferably pentanes or hexane. The method and apparatus disclosed herein utilize a second heating means to increase the temperature of the enriched slurry obtained from the first separation means prior to secondary separation processing, and thereby increasing the amount of unreacted carrier fluid recovered during the secondary separation.

Figure 1:
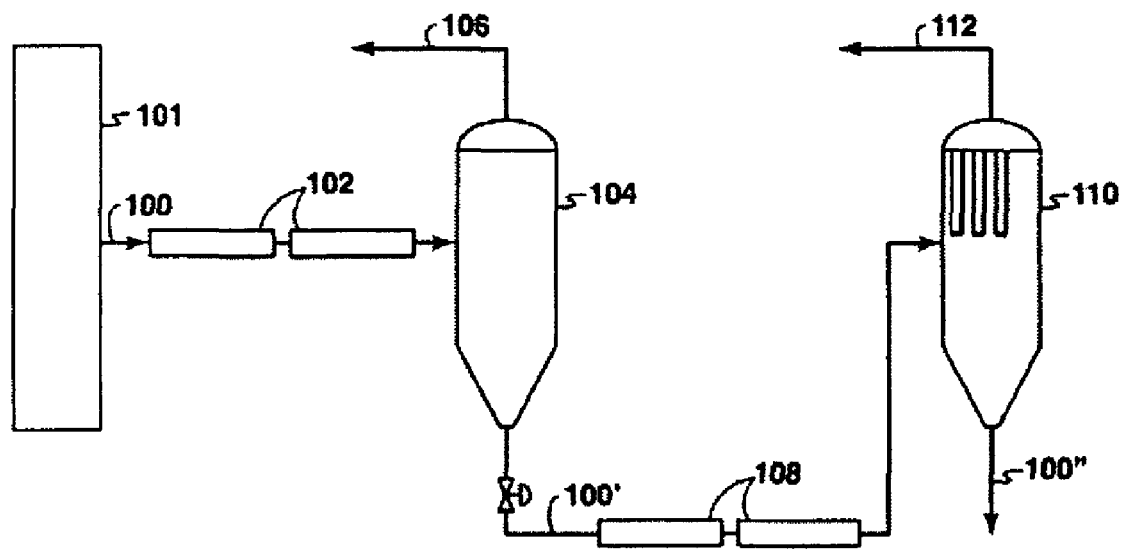
FIG. 1 is a schematic view of one embodiment of the apparatus of the present invention.

FIG. 1 is a schematic illustration of one embodiment of the apparatus for separating polymer from a slurry according to the present invention. A slurry 100 comprising polymer and unreacted carrier fluid from the reactor(s) 101 is provided to a first heating means 102 where the slurry 100 is heated to a temperature sufficient to vaporize at least a portion of the unreacted carrier fluid of the slurry 100. The slurry 100 may comprise any combination of polymer and unreacted carrier fluid commonly known in the art for polymerization processes, including but not limited to polypropylene polymerization processes and polyethylene polymerization processes. The first heating means 102 preferably comprises one or more jacketed pipes. Basically, a jacketed pipe is a pipe within another pipe arrangement where the fluid to be heated (i.e., the slurry) flows in the inner pipe and the heating medium is contained in the annulus between the pipes. Alternatively, the fluid to be heated may flow in the annulus between the pipes and the heating medium may be contained within the inner pipe. The jacketed pipes of the first heating means 102 may be heated by any method commonly known in the art, including but not limited to, steam, hot water, electric heat tracing, microwaves and other radiant heat sources. In embodiments utilizing steam as the heating medium, the steam may be provided by any available source including a steam utility. The flow of the fluid and heating means through the jacketed pipe(s) may be in the same direction (i.e., co-current heat exchange) or in opposite directions (i.e., counter-current heat exchange).

Next, the heated slurry 100 is supplied to a first separator means 104. First separator means 104 preferably operates under high pressure conditions of at least 15 atmospheres (1.52 MPa). The first separation of the slurry 100 may be achieved by use of cyclone separators, gravity separators, bag filters or any other method commonly known in the art. The vaporized portion of the unreacted carrier fluid 106 separated from the slurry 100 exits the first separator means 104 for recovery and recycle to the reactor(s) 101, creating a slurry 100' enriched in polymer. Recovery and recycling to the reactor(s) 101 may be achieved by any recycling means commonly known in the art.

Figure 2:
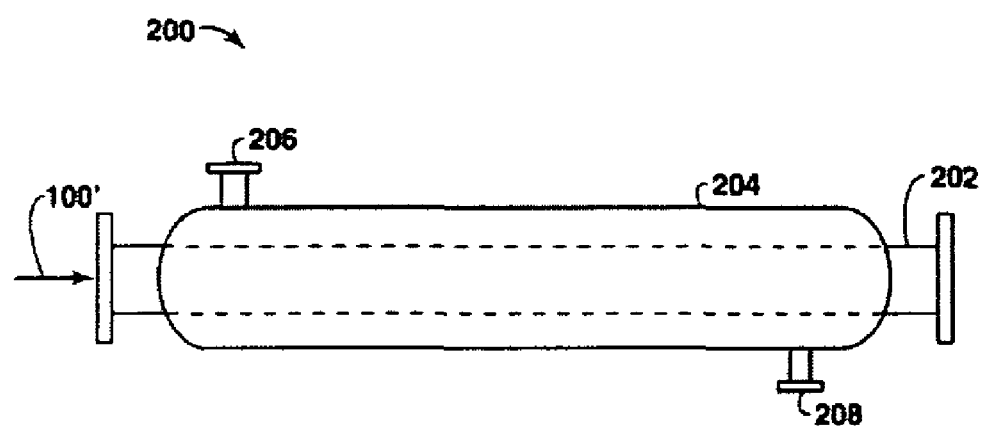
FIG. 2 is a plan view of a jacketed pipe used in connection with the present invention.

The enriched slurry 100' is then transferred to a second heating means 108. Preferably, the second heating means 108 comprises one or more jacketed pipes. FIG. 2 provides a plan view of a jacketed pipe(s) that may be used in connection with the present invention. As illustrated in FIG. 2, jacketed pipe 200 comprises an inner pipe 202 through which the enriched slurry 100' flows. Pipe 202 is surrounded by a jacket 204 that includes an inlet 206 and an outlet 208. The heating medium (typically hot water or pressurized steam) enters the annulus between jacket 204 and inner pipe 202 through inlet 206 and, after transferring heat to the slurry through the wall of inner pipe 202, exits the jacket through outlet 208. In an alternative embodiment, not shown, the enriched slurry may flow in the annulus between the pipes and the heating medium may be contained within the inner pipe. The direction of the flow of the enriched slurry may be the same as the direction of the flow of the heating medium through the jacketed pipe(s) (i.e., co-current heat exchange) or the direction of the flow of the enriched slurry may be opposite the direction of the flow of the heating medium through the jacketed pipe(s) (i.e., counter-current heat exchange). In embodiments comprising two or more jacketed pipes, the pipes may be connected in a series configuration or in a parallel configuration.

Figure 3:
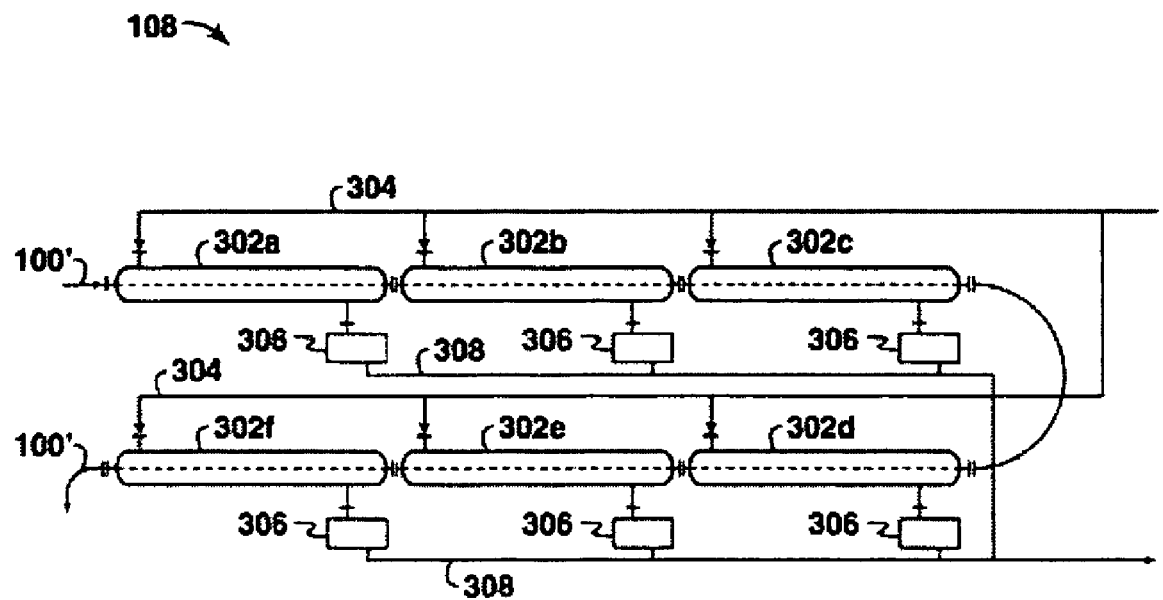
FIG. 3 is a schematic view of a multiple jacketed pipe embodiment of the second heating means of the present invention.

FIG. 3 illustrates one embodiment of a series configuration of the jacketed pipes of the second heating means 108 according to the present invention. As illustrated in FIG. 3, enriched slurry 100' enters the first jacketed pipe 302a. The enriched slurry 100' advances through the remaining jacketed pipes, 302b through 302f. The heating medium enters the annulus of each jacketed pipe 302a through 302f, as described above, through inlets 304. After transferring heat to the enriched slurry 100', the heating medium exits the jacketed pipes 302a through 302f through outlets 308. In embodiments where steam is used as the heating medium, the heating medium may pass through steam traps 306 prior to exiting the jacketed pipes 302a through 302f through outlets 308. The heated, enriched slurry 100' then exits the second heating means 108 through the downstream end of the last jacketed pipe (302f) and continues toward the second separator means, as disclosed herein. In an alternative embodiment, not shown, the enriched slurry may flow in the annulus between each of the jacketed pipes while the heating medium may be contained within each of the inner pipes.

The jacketed pipes of the second heating means 108 are heated by any methods commonly known in the art, including but not limited to, steam, hot water, electric heat tracing, microwaves and other radiant heat sources. In embodiments utilizing steam as the heating medium, the steam may be provided by any available source including a steam utility. The second heating means 108 increases the temperature of the enriched slurry 100' to a level sufficient to vaporize at least a portion of the remaining unreacted carrier fluid of the enriched slurry 100'.

The transfer of the enriched slurry 100' from the first separator means 104 to the second heating means 108 is facilitated by the difference in pressure between the first separator means 104 and the second separator means 110, without providing any additional energy to the system. The number of pipes that may be incorporated into the second heating means 108 is limited only by the available pressure to move the enriched slurry 100' between the first separator means 104 and the second separator means 110, as well as the space available for installation of the jacketed pipes. In another embodiment, an additional motive device, not shown, may be provided at any location between the first separator means 104 and the second separator means 110 to move the enriched slurry 100' through the second heating means 108.

Next, the heated, enriched slurry 100' is supplied to a second separator means 110 for additional separation. The second separator means 110 preferably operates under low pressure conditions of about 1 atmosphere (0.10 MPa) or less. Separation in this step may be achieved by use of a bag filter, though other methods commonly known in the art may also be employed. In this second separation, the vaporized portion of the unreacted carrier fluid 112 separated from the enriched slurry 100' exits the second separator means 110 for compression, recovery and recycling to the reactor(s) 101, creating a slurry 100" further enriched in polymer. Increased amounts of vaporized, unreacted carrier fluid are compressed, recovered and recycled to the reactor(s) 101 using the apparatus of the current invention versus current processing equipment configurations as described herein. The compression, recovery and recycling to the reactor(s) 101 may be achieved by any means commonly known in the art. As is commonly known to those of ordinary skill in the art, the vaporized unreacted carrier fluid 112 may be fed separately to the reactor(s) 101 or it may be combined with vaporized, unreacted carrier fluid 106.

In other embodiments of the present invention, additional heating means and separating means (i.e., a third heating means and a third separating means, a fourth heating means and a fourth separating means, etc.) may be provided if desired.

Subsequent to processing by the second separator means 110, the further enriched slurry 100" is fed downstream to undergo final processing steps which may include heating the further enriched slurry 100", removal of residual unreacted carrier fluid and/or catalyst system deactivation. The removal of increased amounts of unreacted carrier fluid by the apparatus described above increases the downstream operating rate and overall capacity of the polymerization unit by reducing the amount of unreacted carrier fluid in the further enriched slurry 100". The reduction in the amount of unreacted carrier fluid in the further enriched slurry 100" subsequently reduces both the volume of residual unreacted carrier fluid fed downstream and the burden on the downstream processing equipment to remove the residual unreacted carrier fluid.

According to the present invention, one embodiment of the method for separating polymer from a slurry, wherein the slurry comprises polymer and unreacted carrier fluid, includes supplying a slurry from a reactor(s) to a first heating means to increase the temperature of the slurry. The slurry from the reactor(s) is heated to a temperature sufficient to vaporize at least a portion of the unreacted carrier fluid of the slurry. The slurry may comprise any combination of polymer and unreacted carrier fluid commonly known in the art for polymerization processes, including but not limited to polypropylene polymerization processes and polyethylene polymerization processes. The first heating means preferably comprises one or more jacketed pipes. The jacketed pipes of the first heating means may be heated by any method commonly known in the art, including but not limited to, steam, hot water, electric heat tracing, microwaves and other radiant heat sources. In embodiments utilizing steam as the heating medium, the steam may be provided by any available source including a steam utility.

The heated slurry is then supplied to a first separator means to extract a portion of unreacted carrier fluid from the slurry to obtain a slurry enriched in polymer. First separator means preferably operates under high pressure conditions of at least 15 atmospheres (1.52 MPa). The first separation of the slurry may be achieved by use of cyclone separators, gravity separators, bag filters or any other method commonly known in the art. The vaporized portion of the unreacted carrier fluid from the first separator means is recovered and provided to a recycling means for recycling the unreacted carrier fluid to the reactor(s). The recycling means may be any such means commonly known in the art.

The enriched slurry is then provided to a second heating means to increase the temperature of the enriched slurry. The second heating means preferably comprises one or more jacketed pipes. In embodiments comprising two or more jacketed pipes, the pipes may be connected in a series configuration or in a parallel configuration. The jacketed pipes of the second heating means may be heated by any methods commonly known in the art, including but not limited to, steam, hot water, electric heat tracing, microwaves and other radiant heat sources. In embodiments utilizing steam as the heating medium, the steam may be provided by any available source including a steam utility. The enriched slurry is then heated to a temperature sufficient to vaporize at least a portion of the remaining unreacted carrier fluid of the enriched slurry. The transfer of the enriched slurry from the first separator means to the second heating means is facilitated by the difference in pressure between the first separator means and the second separator means, without providing any additional energy to the system. The number of jacketed pipes that may be incorporated into the second heating means is limited only by the pressure available in the system to move the enriched slurry from the first separator means to the second separator means and by the space available for the installation of the jacketed pipes. In another embodiment, an additional motive device may be provided at any location between the first separator means and the second separator means to move the enriched slurry through the second heating means.

Next, the heated, enriched slurry is supplied to a second separator means to extract an additional portion of unreacted carrier fluid from the enriched slurry to obtain a further enriched slurry. The second separator means operates under pressures lower than the pressures of the first separator means. The second separator means preferably operates under low pressure conditions of about 1 atmosphere (0.10 MPa) or less. Separation in the second separator means according to this method may be achieved by use of a bag filter, though other methods commonly known in the art may also be employed. Preferably, the vaporized portion of the unreacted carrier fluid from the second separator means is provided to a recycling means for compression, recovery and recycling to the reactor(s). The recycling means may be any such means commonly known in the art. The amount of unreacted carrier fluid recovered from the second separator means following heating by the second heating means according to the present invention is greater than the amounts of unreacted carrier fluid recovered versus current processing methods as described herein.

In other embodiments of the present invention, additional heating means and separating means (i.e., a third heating means and a third separating means, a fourth heating means and a fourth separating means, etc.) may be provided if desired.

Subsequent to processing by the second separator means, the further enriched slurry is fed downstream to undergo final processing steps which may include heating the further enriched slurry, removal of residual unreacted carrier fluid and/or catalyst system deactivation. The removal of increased amounts of unreacted carrier fluid by the apparatus described above increases the downstream operating rate and overall capacity of the slurry polymerization unit by reducing the amount of unreacted carrier fluid in the further enriched slurry. The reduction in the amount of unreacted carrier fluid in the further enriched slurry subsequently reduces both the volume of residual carrier fluid fed downstream and the burden on the downstream processing equipment to remove the residual unreacted carrier fluid.

INDUSTRIAL APPLICABILITY

The method and apparatus according to the current invention are useful in the separation of polymer from a slurry, wherein the slurry comprises polymer and unreacted carrier fluid.

In one embodiment of the invention, the method for separating polymer from a slurry comprising polymer and unreacted carrier fluid, comprises:
(a) supplying the slurry to a first heating means to increase the temperature of the slurry;
(b) using a first separator means to extract a portion of the unreacted carrier fluid from the slurry to obtain a slurry enriched in polymer, the first separator means having a first pressure;
(c) supplying the enriched slurry to a second heating means to increase the temperature of the enriched slurry; and
(d) using a second separator means to extract an additional portion of the unreacted carrier fluid from the enriched slurry to obtain a further enriched slurry, the second separator means having a second pressure, the second pressure being less than the first pressure.

Additionally, the method may further comprise using one or more recycling means for recycling the unreacted carrier fluid from the first separator means and/or the second separator means to the reactor(s).

In another embodiment, the method for increasing the operating rate of a slurry polymerization unit, comprises the steps of:
(a) separating polymer from a slurry, the slurry comprising polymer and unreacted carrier fluid, the separation comprising:
  (i) supplying the slurry to a first heating means to increase the temperature of the slurry;
  (ii) using a first separator means to extract a portion of the unreacted carrier fluid from the slurry to obtain a slurry enriched in polymer, the first separator means having a first pressure;
  (iii) supplying the enriched slurry to a second heating means to increase the temperature of the enriched slurry; and
  (iv) using a second separator means to extract an additional portion of unreacted carrier fluid from the enriched slurry to obtain a further enriched slurry, the second separator means having a second pressure, the second pressure being less than the first pressure, and
(b) providing the further enriched slurry to downstream processing equipment for further processing which may include heating of the further enriched slurry, final removal of unreacted carrier fluid and/or catalyst system deactivation.

In yet another embodiment of the invention, the apparatus for separating polymer from a slurry comprising polymer and unreacted carrier fluid, comprises:
(a) a first heating means for increasing the temperature of the slurry;
(b) a first separator means for extracting a portion of the unreacted carrier fluid from the slurry to obtain a slurry enriched in polymer, the first separator means having a first pressure;
(c) a second heating means for increasing the temperature of the enriched slurry; and
(d) a second separator means for extracting an additional portion of the unreacted carrier fluid from the enriched slurry to obtain a further enriched slurry, the second separator means having a second pressure, the second pressure being less than the first pressure.

The apparatus may further comprise one or more means for recycling the unreacted carrier fluid from the first separator means and/or the second separator means to the reactor(s).

EXAMPLES

An embodiment of the current invention was tested on an existing commercial polypropylene slurry polymerization unit. The operating rate and monomer loss for the existing unit (i.e., without the second heating means disclosed herein) are expressed as X thousand pounds per hour and Y percent, respectively. The test included the installation of a second heating means, comprising six jacketed pipes configured in series (see FIG. 3), located between an existing first separator means and an existing second separator means.

The polypropylene polymerization unit was run using standard processing conditions and methods, with the addition of the second heating means of the present invention. The surprising increase in the plant operating rate is disclosed in Table 1, below. Additionally, the data in Table 1 shows a reduction in monomer loss of about 10%, thereby evidencing the improvement in the separation, recovery and recycling of the unreacted carrier fluid when utilizing a second heating means.

TABLE 1

|  | Without second heating means | With second heating means | Change |
|---|---|---|---|
| Plant Operating Rate (k#/hr) | X | 1.15 X | +15% |
| Granules Temperature in First Separator | 163° F. (72.78° C.) | 160° F. (71.11° C.) | N/A |
| Granules Temperature in Second Separator | 147° F. (63.89° C.) | 161° F. (71.67° C.) | +14° F. (+7.78° C.) |
| Granules Temperature after Heating and Stripping | 183° F. (83.89° C.) | 188° F. (86.67° C.) | +5° F. (+2.78° C.) |
| Monomer Loss with Polymer (%) | Y | 0.9 Y | −10% |

As we have demonstrated above, the method and apparatus of the current invention provide an unexpected increase in the operating rate (+15% in the above example), and thereby overall operating efficiency, of a slurry polymerization unit as a result of improved efficiency in slurry separation and removal of unreacted carrier fluid. The reduction in monomer loss obtained from the method and apparatus of the present invention (a reduction of 10% in the above example) further evidences the improved operating efficiency.

The above description is intended to be illustrative of the invention, but should not be considered limiting. Persons skilled in the art will recognize that various modifications may be made without departing from the spirit and scope of the invention. Accordingly, the invention will be deemed to include all such modifications that fall within the appended claims and their equivalents.

What is claimed is:

1. A method for separating polymer from a slurry, said slurry comprising said polymer and unreacted carrier fluid, comprising:
    (a) heating a slurry to increase the temperature of said slurry to a temperature sufficient to vaporize at least a portion of the unreacted carrier fluid;
    (b) removing a portion of said unreacted carrier fluid from said slurry in a first extraction to obtain a slurry enriched in polymer, said first extraction occurring at a first pressure of at least 1.52 MPa;
    (c) heating said enriched slurry to increase the temperature of said enriched slurry to a temperature sufficient to vaporize at least a portion of the unreacted carrier fluid; and
    (d) removing an additional portion of said unreacted carrier fluid from said enriched slurry in a second extraction to obtain a further enriched slurry, said second extraction occurring at a second pressure of less than 0.1 MPa.

2. The method of claim 1, wherein said slurry is produced in a slurry polymerization reactor, and wherein said method further comprises recycling said extracted, unreacted carrier fluid from at least one of (b) and (d).

3. The method of claim 1, wherein said enriched slurry is heated in at least one of steps (a) and (c) using a means comprising at least one jacketed pipe.

4. The method of claim 3, wherein said means comprises at least two jacketed pipes.

5. The method of claim 4, wherein said at least two jacketed pipes are configured in series.

6. The method of claim 4, wherein said at least two jacketed pipes are configured in parallel.

* * * * *